(12) United States Patent
Sikharulidze

(10) Patent No.: US 7,633,581 B2
(45) Date of Patent: Dec. 15, 2009

(54) REFLECTIVE COLOR DISPLAY DEVICE WITH SELECTIVE REFLECTOR DIRECTLY COUPLED TO OUTSIDE SURFACE OF CELL WALL OF DISPLAY ELEMENT

(75) Inventor: David Sikharulidze, Bristol (GE)

(73) Assignee: Hewlett-Packard Development Company, L.P., Houston, TX (US)

( * ) Notice: Subject to any disclaimer, the term of this patent is extended or adjusted under 35 U.S.C. 154(b) by 474 days.

(21) Appl. No.: 11/388,370

(22) Filed: Mar. 23, 2006

(65) Prior Publication Data
US 2006/0232731 A1    Oct. 19, 2006

(30) Foreign Application Priority Data
Mar. 29, 2005  (GB) ................... 0506192.4

(51) Int. Cl.
*G02F 1/1335* (2006.01)
(52) U.S. Cl. ............ 349/115; 349/106; 349/176
(58) Field of Classification Search ........... 349/115, 349/104, 106, 110, 158, 176
See application file for complete search history.

(56) References Cited

U.S. PATENT DOCUMENTS

| 5,691,790 | A  | * | 11/1997 | Havens et al. ........... 349/113 |
| 6,122,024 | A  | * | 9/2000  | Molsen et al. ........... 349/88  |
| 6,262,707 | B1 |   | 7/2001  | Sheridon |
| 6,266,113 | B1 | * | 7/2001  | Yamazaki et al. ........ 349/115 |
| 6,549,261 | B1 |   | 4/2003  | Okada et al. |
| 2004/0051827 | A1 | * | 3/2004 | Hinata et al. ........... 349/113 |

FOREIGN PATENT DOCUMENTS

| EP | 1264210 | 3/2001 |
| EP | 0819971 | 10/2002 |
| EP | 1472567 | 7/2003 |
| WO | WO02/100155 | 12/2002 |
| WO | WO03021343 | 3/2003 |

OTHER PUBLICATIONS

Endo, Soda, Takagi, Kitayama, Yuasa, Kishi, Ikeda & Matsuda; "LP-12: Late-News Poster: Color In-plane EPD Using Anisotropic Scattering Layer"; SID 04 Digest; pp. 674-677; revised version of a paper presented at the 23rd International Display Research Conf. held Sep. 16-18,2003 in Pheonix AZ, USA.

Masutani, Roberts, Schuller, Yasuda, Sakaigawa, Cross & Bloor: "A novel polarizer-free dye-doped polymer-dispersed liquid crystal for reflective TFT displays"; Journal of the SID 12/3, 2004 pp. 301-307.

* cited by examiner

*Primary Examiner*—John Heyman

(57) ABSTRACT

A reflective colour display device comprising a display element including two opposed cell walls enclosing a layer of an electro-optic material, each cell wall being provided with at least one electrode on an inner surface thereof for applying an electric field across at least some of the electro-optic material, and a selective reflector on one of said cell walls, wherein the electro-optic material is electrically-switchable between a first state in which the display element will diffusely reflect substantially all wavelengths of visible light transmitted by the selective reflector, and a second state in which the display element will reflect light transmitted by the selective reflector at a substantially lower intensity than it does when the electro-optic material is in the first state.

18 Claims, 5 Drawing Sheets

REFLECTIVE COLOR DISPLAY DEVICE WITH SELECTIVE REFLECTOR DIRECTLY COUPLED TO OUTSIDE SURFACE OF CELL WALL OF DISPLAY ELEMENT

RELATED APPLICATIONS

This application for letters patent is related to and claims the benefit of an earlier filing date and right of priority of foreign filed patent application GB0506192.4, filed in the United Kingdom on Mar. 29, 2005, titled "Reflective Colour Display Device", which is also hereby incorporated by reference.

BACKGROUND

Much effort has been devoted to the development of transmissive backlit displays for the flat panel display market. However reflective displays, which do not require backlighting, are desirable for low power applications and for paper-like displays that can be used as alternatives to the printed page. Displays with high reflectivity, high contrast, and colour capability are particularly desirable for such applications.

One approach has used electrophoretic display devices (EPDs), but there are problems with colour switching in conventional electrophoretic and other light-scattering systems. In some cases in these systems standard transmissive colour filters are used. Lower transmittance of the filters noticeably reduces brightness.

Most prior art electrophoretic devices are switchable between two colours but are not full colour devices. Examples are the E-ink electrophoretic display described in U.S. Pat. No. 6,262,707, or retroreflective electrophoretic displays described in EP 1 264 210. WO 2002/100155 describes an attempt to realise an electrophoretic device containing different pigments for multicolour switching. However the control of migration of different coloured pigments under different applied voltages is problematic and limits the practical fabrication of this device.

T. Endo, T. Soda, S. Takagi, in *SID*2004 *Digest of technical papers*, v.XXXY, book 1, 674-677, (2004), describe a colour in-plane EPD using an anisotropic scattering layer. The device provides an RGB display which uses a colour filter in the background and works in transmittance mode with a backlight. The display uses in-plane switching. One pulse cause migration of pigments which collect on spacer walls and light is transmitted through a relevant pixel with a colour filter. An opposite pulse provides opposite migration of the pigment particles, which cover an area under the pixel and block light transmission. The colour filters reduce brightness, which makes the display less effective for reflective mode.

Scattering and PDLC systems use dyes for colouring, for example as described by Akira Masutani, Tony Roberts, Bettina Shuller, Akio Yasuda, Akira Sakaigawa, Graham Cross, David Bloor in "A novel polarizer free dye-doped polymer dispersed liquid crystal for reflective TFT displays" *Journal of the SID*, v. 12, No 3, 301-308(2004). These systems also are monochrome (bicolour) and for multicolour switching a colour filter mask is needed.

DETAILED DESCRIPTION

Figures 1A, 1B:
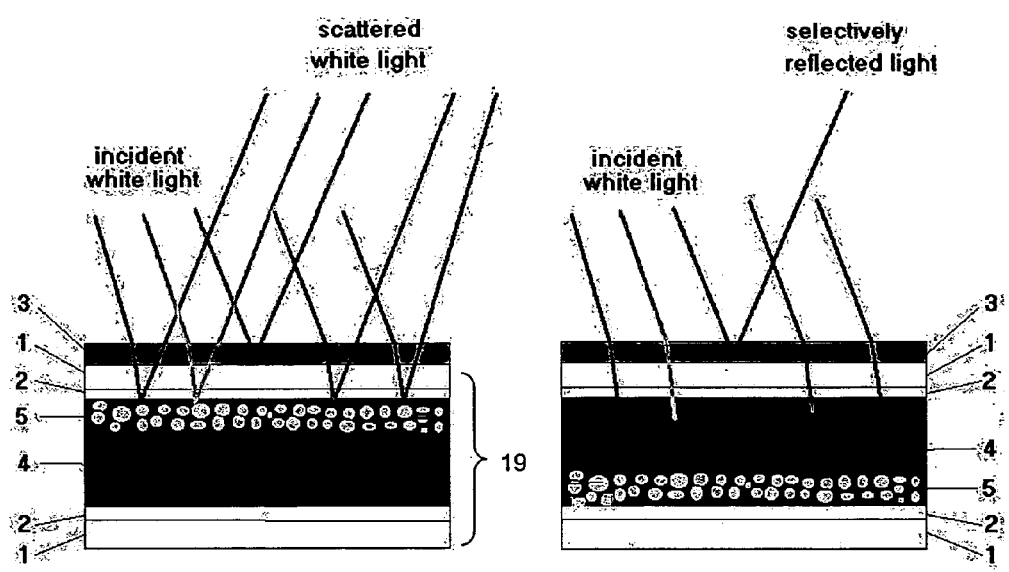
FIGS. 1a-b show schematic sectional representations of part of a reflective colour display device in accordance with an embodiment of the present invention.

The reflective colour display device shown in FIG. 1 comprises a selective reflector 3 mounted on an external surface of a display element 19. In this embodiment, the display element 19 is an electrophoretic cell comprising spaced apart cell walls (substrates) 1 each of which carries an electrode 2 on an inner surface. Single electrodes 2 are illustrated in this example, but it will be understood that complex displays may be formed using pluralities of opposed row (R) and column (C) electrodes, overlapping regions of which define pixels in a manner well known per se. The electrode on the cell wall on which the selective reflector 3 is mounted must be translucent, but the electrode on the lower cell wall may be translucent or opaque.

The space between the cell walls 1 is filled with a fluid 4 which is dyed black. In this example the fluid 4 is a nematic liquid crystal (LC) material, but other materials than liquid crystals could also be used, for example dielectric oils. Suitable fluid materials will be well known to those skilled in the art of EPD manufacture. The black dye may be pleochroic or non-pleochroic. The fluid 4 is doped with white particles 5, in this example particles of $TiO_2$ of size 200-400 nm.

The display element 19 is switchable between a first state (FIG. 1a) which diffusely reflects white light, and a second state (FIG. 1b) in which the dyed liquid crystal absorbs substantially all visible light transmitted by the selective reflector 3. The first state appears white and the second state appears coloured, depending on the wavelengths of light reflected by the selective reflector 3. Switching between coloured and white states is controlled by applied electrical pulses with different polarity. A pulse with suitable polarity provides electromigration of white pigments towards the upper substrate 1, where they will be collected. The high refractive index (n=2.72) and big size of the $TiO_2$ pigments results in strong scattering of the light. This state looks white because the whole spectrum of light will be reflected from the cell (FIG. 1a). Reversing of the polarity of the applied pulse causes migration of the pigments to the opposite side and light passing through the upper substrate 1 will be absorbed by the dark-coloured LC 4. In this case, because of the selective reflection layer, the cell will reflect only the selected wavelengths and the other wavelengths will pass through and will be absorbed by the dark-coloured LC. So the electrophoretic cell adopts a coloured state, determined by the selective reflection layer (FIG. 1b). The opposite polarity pulse again switches the cell to the white scattered state. This method of achieving a switch from white to coloured reflection is applicable to any display element which is switchable between white and dark states. Any such display elements may be used in the invention. An advantage of using an electrophoretic display element is that the first and second states are each stable until a pulse of reverse polarity is applied, so that the display is bistable and is suitable for use in paper-like displays which may be of very large area.

Figure 2:
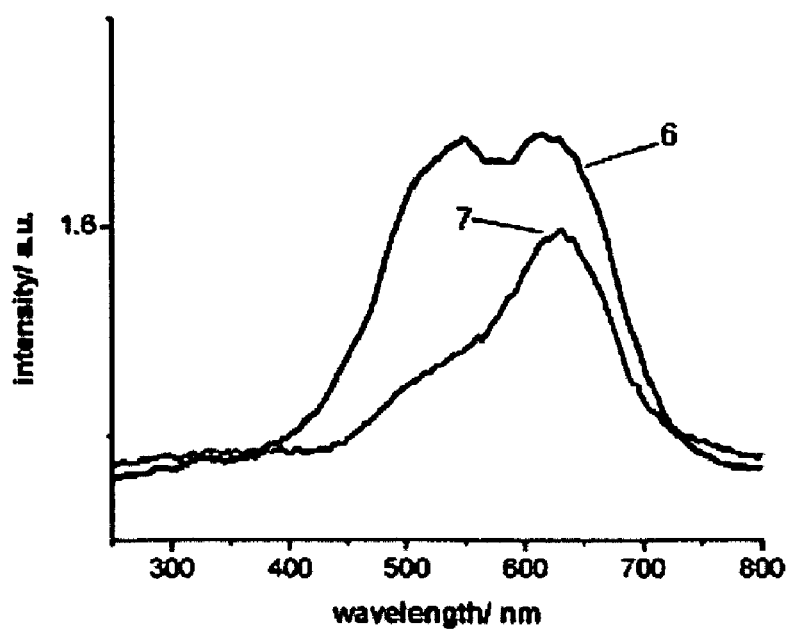
FIGS. 2 and 3 are graphs of intensity of reflected light for two experimental embodiments of the device of FIG. 1.
Figure 3:
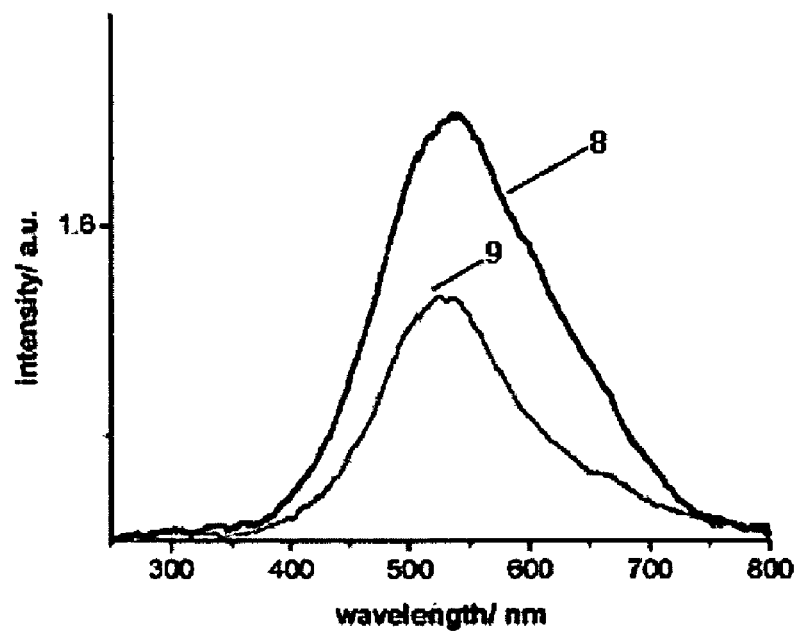

FIG. 2 shows the intensity of reflected light during switching of the 10 μm thickness electrophoretic cell of FIG. 1, with black dyed LC ZLI4756/2 (Merck) containing 25% WP10S (TiO2) white pigments. In this example, the selective reflector 3 is a layer or film of cholesteric polymer RMS03-009 (Merck), providing selective reflection for 640 nm (red) wavelength. The curve 6 shows the intensity of light reflection when $TiO_2$ pigments are stuck to the upper substrate 1 after applying a positive pulse and the display element 19 strongly reflects a wide spectrum of light. After applying a negative pulse, the pigments migrate to the opposite (lower) substrate 1 and the cell reflects red light (curve 7) because of the selective reflector 3. Other wavelengths pass through the selective reflector 3 without reflection and are absorbed by the dark-dyed LC 4. FIG. 3 shows the same switching in the cell with the selective reflector layer 3 being the green RMS03-010. Curve 8 shows light intensity of the white state and curve 9 shows light intensity for the coloured (selective reflection) state.

The same switching between coloured and white states occurs when the display element 19 is a polymer-dispersed liquid crystal (PDLC) cell (FIG. 4). The display element 19 comprises opposed substrates 1 with transparent electrodes 2. The external surface of the upper substrate is covered with the selective reflector 3 and the opposite side of the cell has a black backplane 10. The cell is initially filled with a mixture of a nematic LC with a photopolymerisable polymer precursor. Under UV light the mixture is polymerized, forming the PDLC medium 4 in which small droplets of nematic LC are dispersed within a polymer matrix. The PDLC exhibits an electrically-controlled light-scattering effect. The scattering effect is provided by controlling the orientation of LC molecules under an electrical field in a manner well known per se. High optical anisotropy of the LC provides a strong scattering effect, which depends on the orientation of the LC. It will be understood that the display may be electrically addressed by any suitable means known in the art per se, for example by means of a TFT array or by matrix-addressing with x and y row and column electrodes.

In the initial state the LC molecules will be randomly aligned inside the polymer network and sufficient differences between refractive indices of LC molecules and the polymer will cause the reflection of light in different directions and consequently a strong scattering effect. In this first state (FIG. 4a) all wavelengths will be diffusely reflected and the cell appears white. The LC has positive dielectric anisotropy, and applying a pulse of suitable voltage aligns the molecules of LC vertically. In this second state (FIG. 4b) the PDLC 4 becomes transparent with minimal scattering effect. In this state the cell reflects substantially only the wavelengths reflected by the selective reflector 3. Light of other wavelengths passes through the PDLC medium 4 and will be absorbed by the black backplane 10. The display adopts a coloured state, determined by the selective reflection layer 3. Removal of the applied voltage permits the cell to revert to the white state. In this construction it is also possible to use any dynamic scattering effects, allowing switching between transparent and scattering states, for example a scattering effect in a cholesteric LC or a dynamic scattering effect in a nematic LC with negative dielectric anisotropy.

Figure 5:
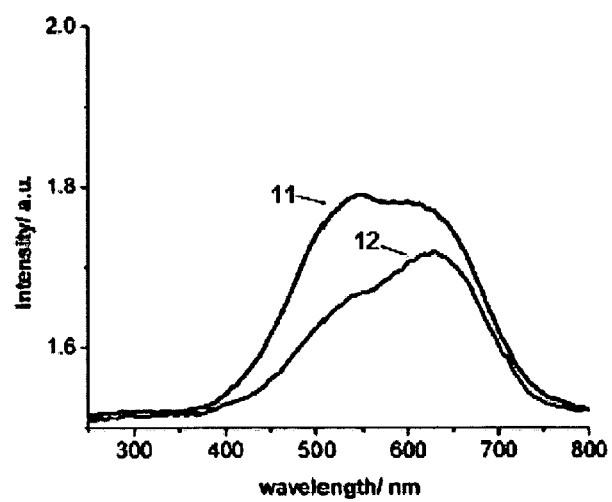
FIGS. 5 and 6 are graphs of intensity of reflected light for two experimental embodiments of the device of FIG. 4.

FIG. 5 shows the switching effect in the PDLC cell. The PDLC cell is prepared by mixing 50% nematic BL037 with high optical anisotropy (0.28) and 50% photopolymer NOA65. This mixture was placed between the substrates 1, spaced 5 μm apart, and exposed to UV light, forming the PDLC. The upper substrate was covered with the selective reflector 3, in this example RMS03-009, providing selective reflection for 640 nm (red) wavelength.

Figure 6:
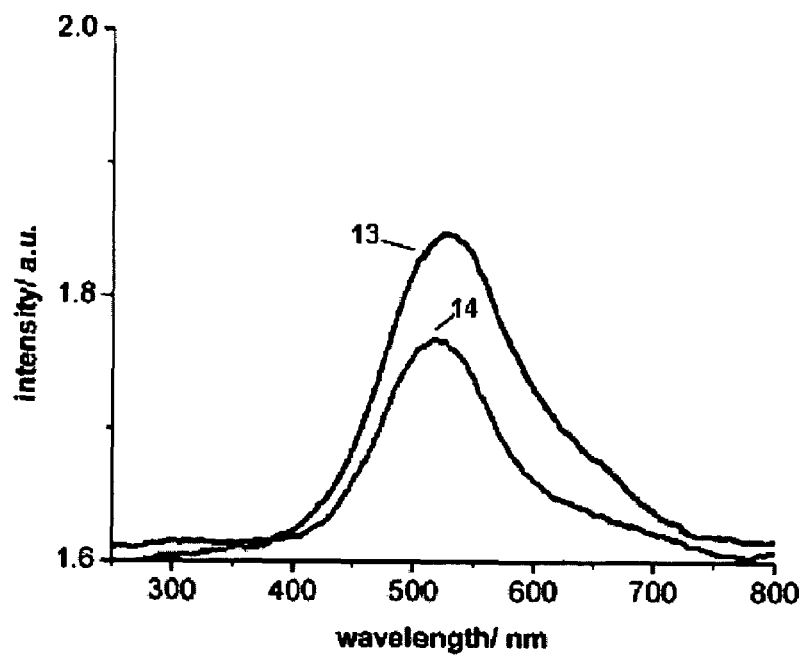
Figure 7:
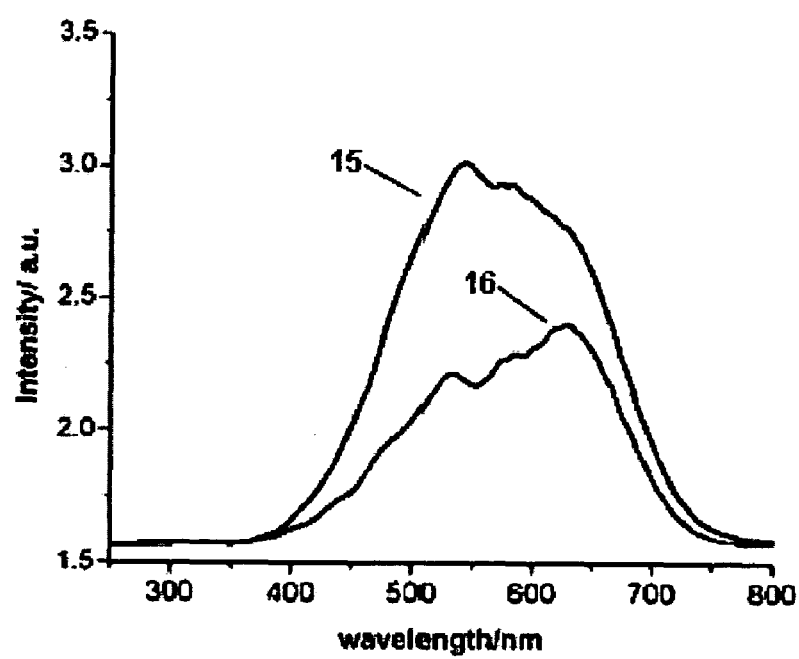
FIGS. 7 and 8 are graphs of intensity of reflected light for two comparative experimental control devices.
Figure 8:
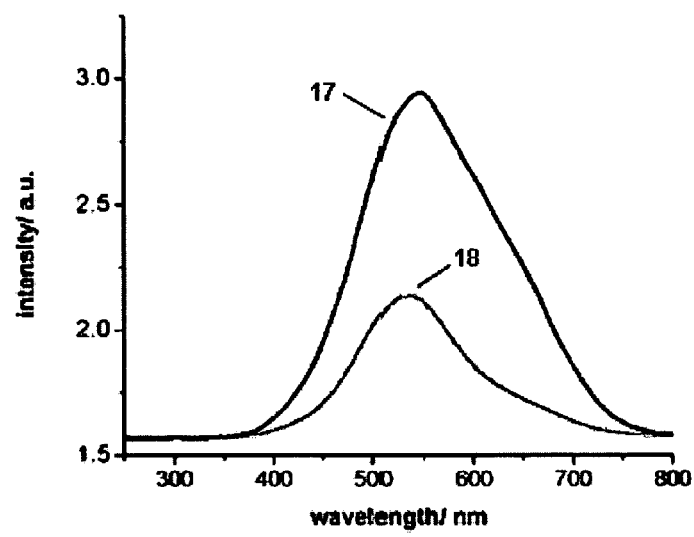

The curve 11 shows light intensity for reflected white light, when the PDLC cell is in the scattering (white) state under a lower voltage. A higher voltage switches the cell to the transparent state with vertical aligned molecules and the display reflects only red light (curve 12). The display switches between red and white colours. FIG. 6 shows switching between white (curve 13) and green (curve 14) colours in the PDLC cell with a layer of green (500 nm) RMS03-010 material as the selective reflector 3. For comparison, FIG. 7 and FIG. 8 respectively show results for the red RMS03-009 and green RMS03-010 selective cholesteric layers 3 with a white backplane and a black backplane in place of the display element 19. The curves 15,17 and curves 16,18 respectively show reflection intensities with the white and black backplane. The curves are very similar to the selective reflection effect observed in the electrically controlled cells of FIGS. 1 and 4, where the light intensity is only lower because of absorption by the layers of the display element 19.

Figures 4A, 4B:
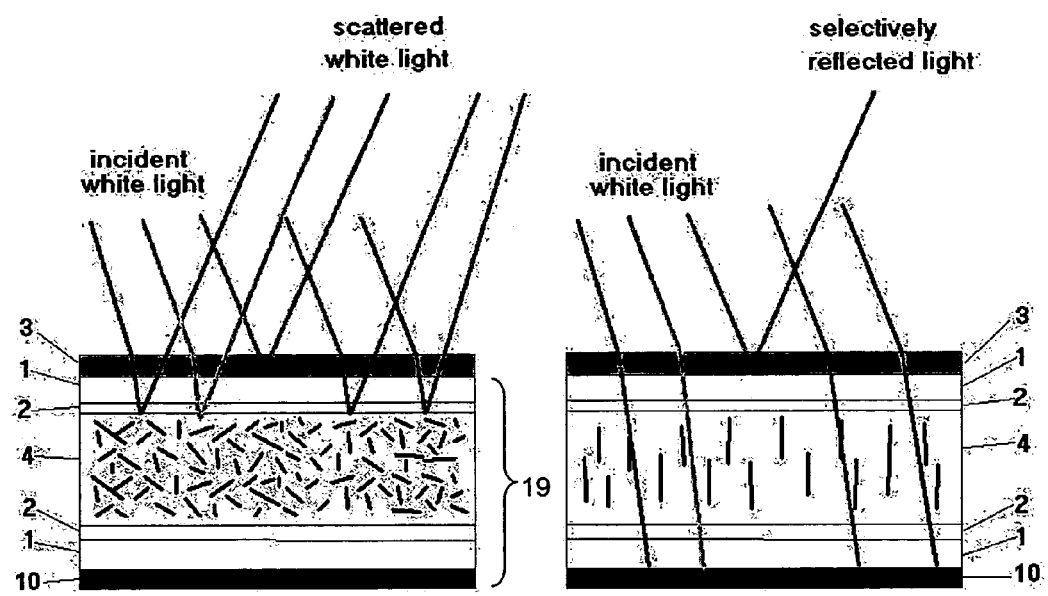
FIGS. 4a-b show schematic sectional representations of part of a reflective colour display device in accordance with another embodiment of the present invention.

It will be understood that the device of FIG. 4 could also be used with a white backplane 10 and a PDLC 4 with a pleochroic black dye dissolved in the LC. In this case, the device element 19 shown in FIG. 4a will absorb light and the display will appear the colour of the selectively-reflected light; in the aligned state of FIG. 4b the pleochroic dye will substantially not absorb light, which will be reflected from the white backplane 10. A black-dyed cholesteric LC could be used in place of the PDLC 4.

Figures 9A, 9B:
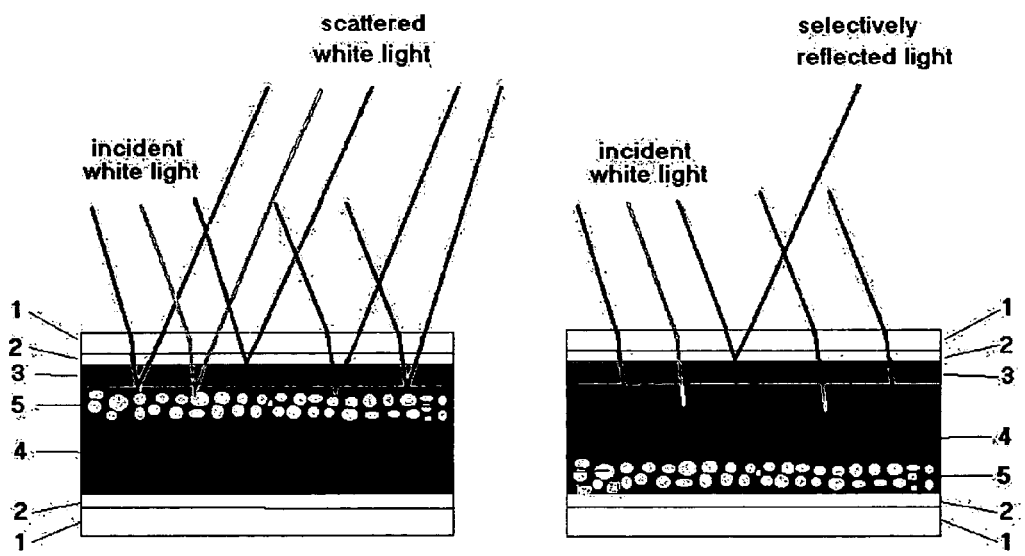
FIGS. 9a-b show schematic sectional representations of part of a reflective colour display device in accordance with a further embodiment of the invention.

Referring now to FIG. 9, a further embodiment of the invention is shown in which the selective reflector is mounted on an internal surface of the upper substrate 3, over the transparent electrode 2. The selective reflector 3 was formed by spincoating with the cholesteric polymers RMS03-009 (red) or RMS03-010 (green). After UV-polymerisation the layer 3 is quite hard and does not dissolve in contact with a liquid layer 4. Apart from the location of the selective reflector 3, this cell is similar to the cell shown in FIG. 1 and works in the same way. We have also prepared PDLC cells similar to those of FIG. 4, but with the selective reflector 3 on an inner surface of the upper substrate 1. These cells also worked in the same way as the cell of FIG. 4. However, we have found that cells with the external reflector 3 show better performance because cells with an internal reflector 3 require more precise matching of optical parameters, substrates and electrodes.

Experimentally the cells have been constructed from two glass or plastic substrates 1 with transparent ITO electrodes 2.

For the $TiO_2$ electrophoretic cell, a thin layer, providing homeotropic alignment, covered both of the substrates over the ITO electrode. Polymer beads controlled the thickness of the cell, which varied from 5-20 μm. Commercial nematic LCs E7, MLC6436-000, dye doped nematic, ZLI4756 (all with positive dielectric anisotropy) and ZLI4788, dye doped ZLI6092(with negative dielectrical anisotropy) from Merck were used. The pure nematic LCs were dyed by dark nonpleochroic dyes. Where a non-mesogenic fluid 4 is used, or a LC which is not homeotropically aligned, pleochroic dyes may also be used. The dyed LCs were mixed with titanium dioxide particles $TiO_2$. The $TiO_2$ particles used were. R700, R102, R104, R106 (from Dupont) with size 0.3-0.4 μm and WP10S, RP10S (from CATALYSTS & CHEMICALS IND. CO., LTD) with size 0.2-0.3 μm. The concentration of the particles in the LC varied from 5-50% by weight of the composition.

PDLC cells were prepared by mixing nematic LCs with photopolymerisable NOA65 (Norland Products, Inc), the concentration of which was varied between 15 and 60%. Nematic LCs E7, E63, BL037 (Merck) were used. Each cell was filled with the LC/NOA65 mixture and exposed by UV light for 2-5 min. Unipolar pulses with amplitude 10-80V and duration 5-50 ms were applied to the cells. Cholesteric polymerized materials RMS03-008 (blue), RMS03-010 (green), RMS03-009 (red) from Merck were used as selective reflectors with selective reflection for wavelength 420 nm, 500 nm and 640 nm, respectively. These materials are spin-coated over a rubbed polyimide layer, providing planar alignment. Under UV light the layer is polymerized and the resulting layer, with thickness about 0.2-1 µm, provides good selective reflection in the respective wavelength ranges.

It should be noted that utilizing a complex mask with different selective layers side by side enables switching with multicolour contrast. Cholesteric LC materials with the necessary helical pitch may be used as the selective reflectors.

As presented herein, the use of selective reflectors allows the possibility of achieving high brightness and switching with multicolour contrast. The selective reflector is distinct from the electro-optic material and its optical properties are substantially unaffected by the application of an electric field across the electrodes. The selective reflector may be provided on an outer surface of the cell wall, or provided on an inner surface.

By selectively changing all or portions of the display element between the first state and the second state, the display, or picture elements thereof, may be switched between a substantially white state and a coloured state.

The selective reflector reflects a particular wavelength band of light while it transmits other incident light. In the first (white) state of the display element, the transmitted light is reflected back through the selective reflector and the display appears white. In the second (black) state of the display element, substantially less of the transmitted light is reflected so that the display assumes the colour of the selectively-reflected light.

The transmitted light can be absorbed by the display element when in the second state so that the display element appears black in the second state in the absence of the selective reflector. In certain embodiments, the display element absorbs substantially all incident visible light when in the second state.

By using a plurality of selective reflector elements side by side, a full colour reflective display may be realised. In certain embodiments, for example, RGB selective reflectors are grouped to selectively provide coloured pixels, each of which is in register with suitable electrodes to switch an area of the display element between states.

The term 'electro-optic material' has used herein to refer to a material which can be induced to change an optical property in response to application of a suitable electric field. The term includes liquid crystal materials and fluids suitable for use in electrophoretic displays. The electro-optic material may be addressed by any suitable means which will be well understood by those skilled in the art of LCD manufacture, for example a TFT array or by row/column matrix addressing.

It is appreciated that certain features of the invention which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the ambit of the present invention specified in the claims.

What is claimed is:

1. A reflective colour display device comprising:
    a) a display element including two opposed cell walls enclosing a layer of an electro-optic material, each cell wall being provided with at least one electrode on an inner surface thereof for applying an electric field across at least some of the electro-optic material, and
    b) a selective reflector on one of said cell walls, said selective reflector being distinct from said electro-optic material, the selective reflector being mounted on an external surface of the display element, one of the cell walls being directly coupled to an inner surface of the selective reflector,
    wherein the electro-optic material is electrically-switchable between a first state in which the display element will diffusely reflect substantially all wavelengths of visible light transmitted by the selective reflector, and a second state in which the display element will absorb substantially all visible light transmitted by the selective reflector.

2. A device according to claim 1, wherein the selective reflector is a film or layer of a cholesteric polymer material.

3. A device according to claim 1, wherein the selective reflector comprises a plurality of different films or layers side by side, each different film or layer capable of selectively reflecting a different wavelength band.

4. A device according to claim 1, wherein the electro-optic material is a composition comprising a mixture of a dark-dyed fluid and light-coloured pigment particles.

5. A device according to claim 4, wherein said fluid is a liquid crystal material.

6. A device according to claim 5, wherein the dye is a non-pleochroic dye and wherein the device further comprises at least one surface alignment on an inner surface of a cell wall for inducing a local homeotropic alignment of said liquid crystal material.

7. A device according to claim 4, wherein said pigment is $TiO_2$.

8. A device according to claims 4, wherein said pigment has a particle size in the range 100-500 µm.

9. A device according to claim 4, wherein said pigment comprises 5-50% w/w of said composition.

10. A device according to claims 1, wherein the electro-optic material is a liquid crystal material.

11. A device according to claim 10, wherein the display element has a dark backplane and the liquid crystal material is switchable between a first diffuse reflective state in which it will reflect substantially all wavelengths of visible light transmitted by the selective reflector, and a second transmissive state in which substantially all light transmitted by the selective reflector is absorbed by the dark backplane.

12. A device according to claim 11, wherein the liquid crystal material is dispersed as small droplets in a polymer matrix.

13. A device according to claim 11, wherein the liquid crystal material is a cholesteric material which scatters light in the absence of an applied electric field.

14. A device according to claim 11, wherein the liquid crystal material is a nematic liquid crystal which substantially transmits light in the absence of an applied field but which scatters light when a suitable electric field is applied so that the display element is capable of operating in a dynamic scattering mode.

15. A device according to claim 10, wherein the display element has a white backplane and the liquid crystal material has a pleochroic dye dissolved therein; the liquid crystal material being switchable between a homeotropic state in which molecules of the liquid crystal material align substantially normally to the plane of the cell walls and in which most light transmitted by the selective reflector is transmitted to the white backplane, and a state in which molecules of the pleochroic dye absorb substantially all of the light transmitted by the selective reflector.

16. A device according to claim 15, wherein the liquid crystal material is a polymer-dispersed liquid crystal material (PDLC).

17. A device according to claim 15, wherein the liquid crystal material is a cholesteric material.

18. A reflective colour display device comprising a selective reflector mounted on an external surface of a display element that is electrically-switchable between a first diffuse reflective state in which it will reflect substantially all wavelengths of visible light transmitted by the selective reflector, and a second state in which the display element will reflect substantially less light than it does in the first state, the display device further comprising a plurality of cell walls, one of the cell walls being directly coupled to an inner surface of the selective reflector.

* * * * *